United States Patent [19]

Simonds

[11] 4,361,210
[45] Nov. 30, 1982

[54] LOCK OR BRAKING MECHANISM

[75] Inventor: Gary L. Simonds, Gainesville, Fla.

[73] Assignee: Beloit Corporation, Beloit, Wis.

[21] Appl. No.: 95,167

[22] Filed: Nov. 19, 1979

[51] Int. Cl.³ .............................................. B61H 7/12
[52] U.S. Cl. ...................................... 188/43; 188/67; 269/237
[58] Field of Search ........................... 188/42, 43, 67; 248/355; 74/531; 254/31, 106; 269/203, 217, 218, 237, 239

[56] References Cited

U.S. PATENT DOCUMENTS

| | | | |
|---|---|---|---|
| 342,992 | 6/1886 | Baker | 269/217 |
| 550,273 | 11/1895 | Jensen | 188/43 |
| 832,318 | 10/1906 | Humphrey | 188/43 |
| 1,718,795 | 6/1929 | Morton | 188/43 |
| 2,642,958 | 6/1953 | Lennon | 188/67 |
| 3,752,465 | 8/1973 | Siegmund | 269/237 |
| 3,891,065 | 6/1975 | Iijima et al. | 188/67 |
| 4,153,142 | 5/1979 | Spisz et al. | 188/67 |
| 4,160,586 | 7/1979 | Ebner | 188/67 |

FOREIGN PATENT DOCUMENTS 437829 11/1926 Fed. Rep. of Germany ........ 188/43
2002073 2/1979 United Kingdom .................. 188/67

Primary Examiner—Edward R. Kazenske
Attorney, Agent, or Firm—Hill, Van Santen, Steadman, Chiara & Simpson

[57] ABSTRACT

For mechanism for releasably locking or braking an elongate element and associated structure comprises mechanism including a member adapted to be mounted on the associated structure and providing clutching surface means engageable with one side of the elongate element. A locking lever has one end pivotally mounted on the member and has intermediate its ends a gripping clamping clutch area thrustable into locking, gripping, clamping engagement toward the clutching surface means for thereby locking the element and the associated structure against relative movement. For rocking the lever in its locking mode a force multiplication device comprises a roller driven as by means of an actuator plunger into force multiplying engagement between a fixed shoulder and a roller on a free end portion of the lever.

9 Claims, 5 Drawing Figures

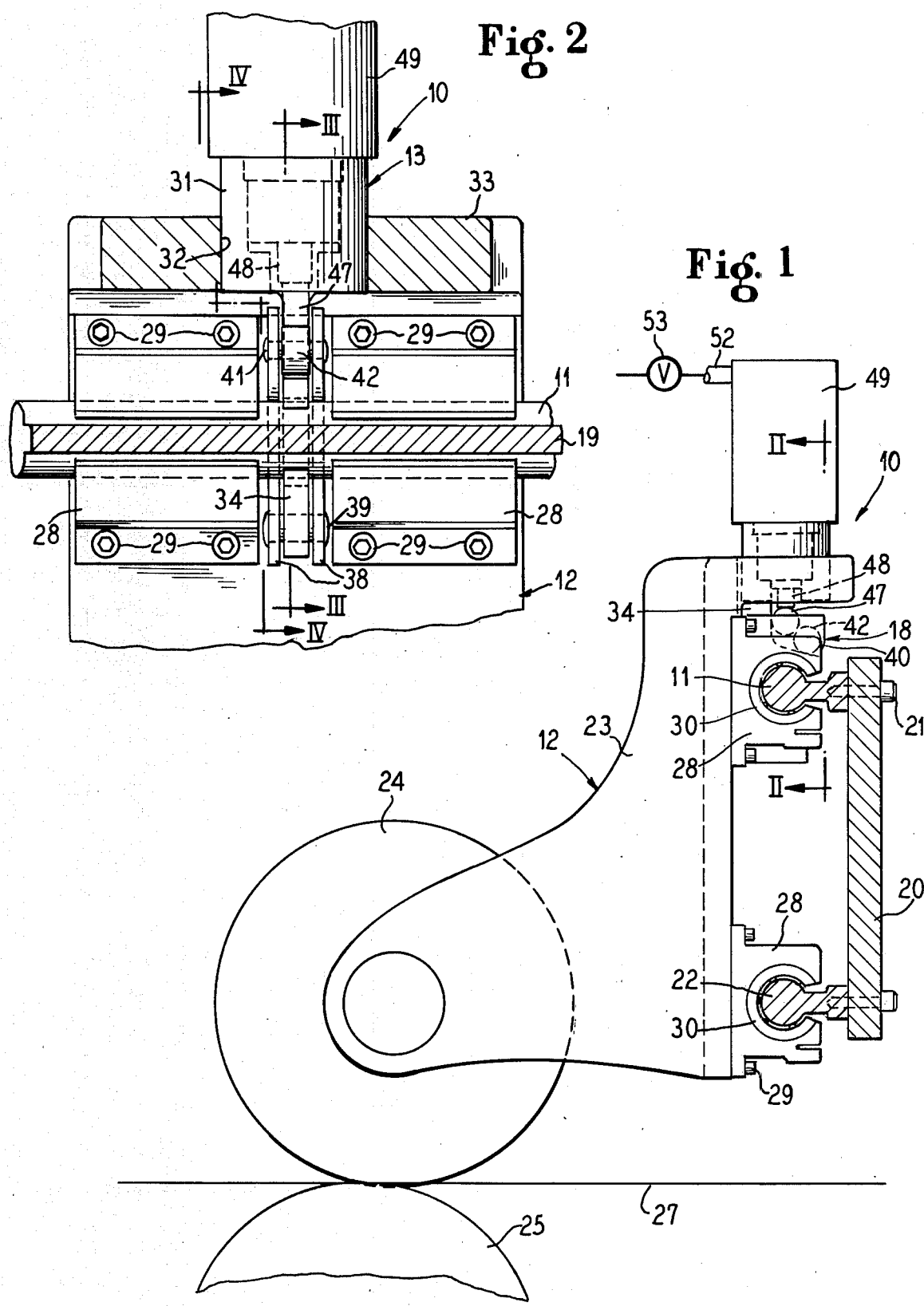

LOCK OR BRAKING MECHANISM

The present invention relates to a new and improved lock or braking mechanism which is constructed and arranged for efficiently releasably retaining an elongate rod-like member and an associated structure against relative movement. More particularly, the invention is especially useful for releasably retaining a structure in adjusted position along a round way.

Round way locks or brakes have heretofore been proposed in which a plunger or brake pad is driven as by means of a direct acting fluid operated actuator against a round way. However, in applications where much vibration is experienced in the operation of the associated apparatus, such prior structures have often been unsatisfactory because of a tendency to lose holding power or slip as a result of the apparatus or machine vibrations.

One practical use for such lock or brake mechanism has been for holding slitters in position for slitting paper or other webs. For proper operation of the slitters it is important that the slitter blades maintain a proper slitting orientation. In the operation of slitters considerable machine vibration is experienced and thus poses a formidable problem in maintaining the proper adjustment. Of course, while slitters have been referred to as one practical utility for lock or braking mechanism of the kind herein referred to, similar problem exists in other apparatus.

An important object of the present invention is to provide a new and improved locking or braking mechanism which will releasably hold an elongate element and associated structure against relative movement.

Another object of the invention is to provide a mechanism which is especially useful for releasably locking a structure along a round way.

A further object of the invention is to provide a new and improved locking and braking mechanism having unique force multiplication means.

The present invention provides a mechanism for releasably locking or braking an elongate element and associated structure against relative movement. For this purpose, the mechanism comprises a member adapted to be mounted on the associated structure and such member has clutching surface means for releasably clutching engagement with one side of the elongate element. A locking lever has one end pivotally mounted on the member. The locking lever has intermediate its ends a gripping clamping clutch area engageable with the element generally opposite to the clutching surface means. Means are provided for rocking the lever toward the element and the clutching surface means for effecting locking, gripping, clamping thrust of the clutch area against the element toward the clutching surface means for thereby locking the element and the associated structure against relative movement.

In the means for rocking the lever, a unique force multiplication device attains unusually powerful clamping, gripping force in the lever with moderate power input as by means of a linear actuator.

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure and in which:

FIG. 1 is fragmentary sectional elevational view of apparatus embodying the invention.

FIG. 2 is an enlarged fragmentary sectional elevational detail view taken substantially along the line II—II of FIG. 1.

Figure 3:
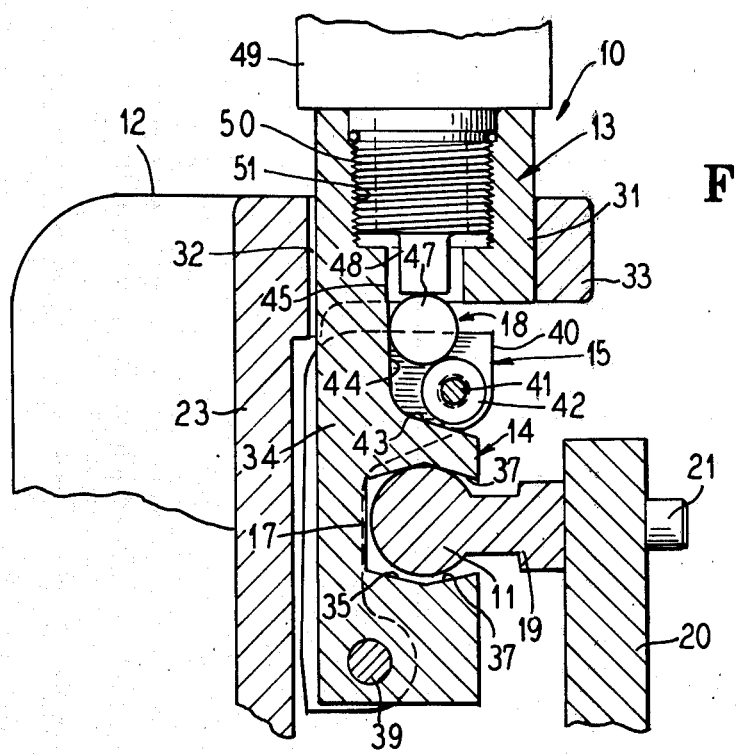
FIG. 3 is a sectional detail view taken substantially along the line III—III of FIG. 2.

On reference to the drawings, a mechanism 10 for releasably locking or braking an elongate element 11 and associated structure 12 against a relative movement comprises a member 13 adapted to be mounted on the associated structure 12. The member 13 has clutching surface means 14 (FIGS. 3 and 4) for releasable clutching engagement with one side of the elongate element 11. A locking lever 15 has one end pivotally mounted on the member 13. Intermediate its ends, the locking lever 15 has a gripping, clamping clutch area 17 engageable with the element 11 generally opposite to the clutching surface means 14. Means 18 are provided for rocking the lever 15 toward the element 11 and the clutching surface means 14 for effecting locking, gripping, clamping thrust of the clutch area 17 against the element 11 toward the clutching surface means 14 for thereby locking the element 11 and the associated structure 12 against a relative movement.

As illustrated by way of example, the elongate element 11 comprises a round way along which the structure 12 is adapted to be adjustably moved. For this purpose the element 11 is of generally cylindrical rod shape having integrally rigid therewith along its length a bracket 19 by which it is adapted to be mounted on a frame bar 20 in an apparatus or machine in which the mechanism 10 is used. Screws or bolts 21 may be employed to secure the bracket 19 to the frame member 20. For stabilized support of the structure 12, a second round way 22 similar to the round way 11 may be mounted on the frame 20 in spaced parallel relation to the round way 11.

Figure 5:
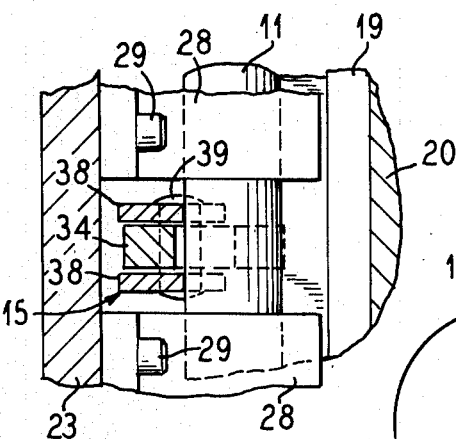
FIG. 5 is a sectional detail view taken substantially along the line V—V of FIG. 4.

Merely by way of example, the structure 12 comprises a bracket 23 carrying a slitter 24 in the form of a rotary disk slitter blade which is adjustably cooperatively mounted in slitting relation to a companion slitter blade 25 for slitting web material 27 such as a paper web. Mounting of the bracket 23 on the round ways 11 and 22 is desirably effected in a manner which not only provides stable support for the bracket, but also permits as nearly as practicable friction free adjustment of the structure 12 along the round ways. Accordingly, pillow blocks 28 are mounted on the back of the bracket 23 and secured thereto as by means of screws 29 and carry open type ball bushings 30 in riding engagement with the round ways 11 and 22. As best seen in FIGS. 2 and 5, a pair of the pillow blocks 28 flanks in suitable clearance relation that portion of the mechanism 10 which is in releasable locking or clutching relation to the round way 11.

Figure 4:
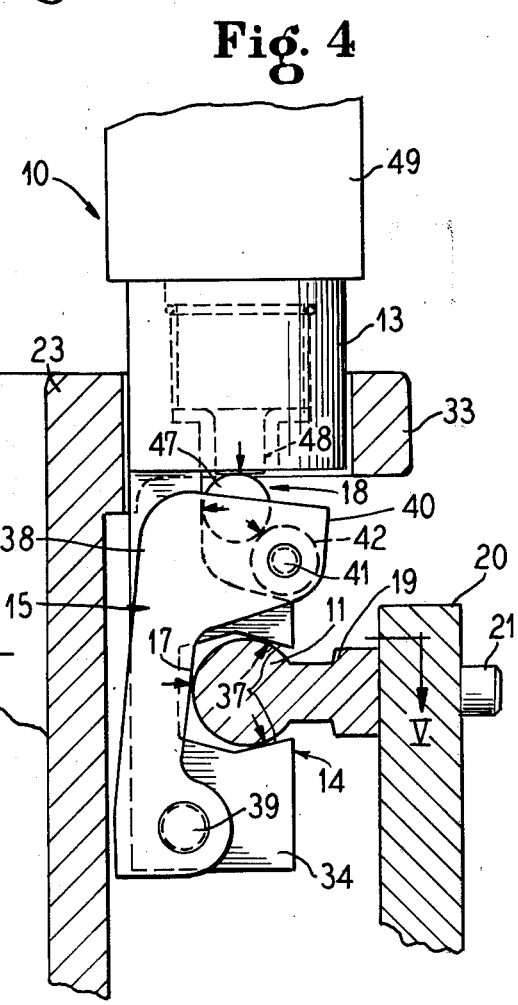
FIG. 4 is a sectional elevational detail view taken substantially along the line IV—IV of FIG. 2.

In a preferred construction, the mechanism 10 is constructed and arranged to be associated with the structure 12 in a manner which enables the mechanism 10 to retain the structure 10 positively in adjusted positions along the round way 11, but nevertheless permits the member 13 of the mechanism to, in effect float relative to the structure 12 so as to permit efficient operation of the mechanism 10 without placing any stress or strain on the way 11 nor the structure 12. To this end, the member 13 has a body 31 which is conveniently cylindrical and of a length to be received vertically in a complementary socket aperture 32 in a horizontal rearwardly extending flange 33 on the bracket 23 and overhanging the round way 11 in suitably spaced relation. The aperture 32 is dimensioned to engage in closely slidable relation with opposite sides of the body 31 on a diameter parallel to the axis of the round way 11, while providing clearance for some rocking adjustments of the body 31 in a vertical and a front to rear direction. Thus it will be observed in FIG. 2 that on the diameter parallel to the axis of the round way 11, the sides defining the aperture 32 closely engage the body 31. In FIGS. 3 and 4, it will be noted that there is a sufficient clearance to permit some front to rear self-adjusting movement of the body 31 in the aperture 32.

Projecting rigidly from the body 31 is an elongate, generally vertically projecting extension 34 which carries the clutching surface means 14 and the lever 15. For this purpose, the extension 34 is located in a clearance space between the round way 11 and the body of the bracket 23 and in order to be accommodated in a minimum clearance space between the pillow blocks 28 is of a relatively narrow flat configuration in a plane normal to the axis of the round way 11. In length, the extension 34 is such as to extend a substantial distance to opposite sides of the round way 11, that is, in the illustrated instance, a substantial distance above and a substantial distance below the round way. Intermediate its ends, the extension 34 has a recess 35 within which the round way 11 is received and which provides for the clutching surface means 14. In a simple, rugged, efficient construction, the clutching surface means 14 comprises generally convergently related spaced cooperative clutching surfaces 37 which are part of the walls defining the recess 35 at the side thereof having a slot for clearing the bracket 19. At their outer ends, the surfaces 37 clear the bracket 19 but are spaced apart sufficiently less than the diameter of the round way 11 to enable clutching gripping of the rear side of the round way 11 in a locking mode of the mechanism 10. In non-locking mode, the recess 35, including the surfaces 37 permits free movement of the extension 34 along the round way 11. In a preferred arrangement, the round way 11 supports the mechanism 10 through the extension 34 against longitudinal, in this instance, downward displacement by resting of a sidewall, in this instance the upper wall defining the recess 35 on the round way, substantially as shown in FIG. 3.

In a desirable construction, the locking lever 15 comprises a pair of preferably identical, parallel, coextensive, plates 38 which are, at the end of the lever 15 which is remote from the body 13, pivotally connected to respective opposite sides of the extension 34 by means of a rugged pivot pin 39 adjacent to the free end of the extension 34. Thereby the lever 15 is adapted for rocking toward and away from the round way 11, and more particularly the intermediate gripping, clamping clutch area 17 is adapted to move into and out of its clutching relationship to the round way 11 by virtue of the rockable mounting of the lever 15.

A unique highly efficient force multiplication device is embodied in the means 18 for rocking the lever into the clutching mode. To this end, the lever plates 38 have on their ends adjacently spaced from the body 31 forwardly projecting lever head portions 40 between which is carried on an axle 41 a freely rotatable force receiving roller 42 which freely overlies an underlying clearance edge 43 of the extension 34. The surface 43 extends rearwardly from a thrust shoulder 44 normally spaced from the roller 42 and extending longitudinally on the extension 34 from a clearance aperture 45 in the inner end of the body 31 which overhangs the adjacent free end of the lever 15. In free floating riding engagement on and between the roller 42 and the shoulder 44 is a force transmission roller 47 which is of such a diameter that it cannot escape from its orientation relative to the roller 42 and the shoulder 44 and the lever plate head portions 40 which oppose the opposite ends of the roller 47. Clutching, locking force is transmitted by the roller 47 to the roller 42 by power means comprising a driving plunger 48 of a rectilinear, short stroke fluid powered actuator of the cylinder and piston type having a cylinder 49 provided with an axial threaded stem 50 threadedly engaged in a tapped counterbore 51 opening through the outer end of the body 31 concentric with the clearance aperture 45. Pressure fluid such as compressed air is adapted to be supplied to the actuator cylinder 49 through a duct 52 leading from any desired compressed air source, such, for example, as may also supply other operating devices of the associated machine. Means for controlling the pressure fluid supply through the duct 52 may comprise a valve 53 adapted to be suitably controlled for energizing or activating the actuator 49 or for deactivating the actuator as desired.

In the inactive condition of the mechanism 10, as shown in FIG. 3, the structure 12 is adapted to be freely adjusted longitudinally along the round ways 11 and 22. Upon activating the mechanism 10 as shown in FIG. 4, the device 18 functions to operate the lever 15 with force multiplying effect. That is, the device 18 and the lever 15 multiply the force of the air cylinder actuator 49. As the actuator plunger 48 end drives against the transmission roller 47, the angle of contact between the roller 47 and the lever carried roller 42 becomes more and more acute and the resultant force on the lever 15 is proportionately increased due to the lever itself being a second class lever. The force multiplication is directly related to the ratio between the distance between the applied force and the pivot 39 and the distance between the pivot 39 and the contact point of the clutch area 17 indicated by directional arrow in FIG. 4 with the engaged surface of the round way 11 with which the braking engagement is effected. Another area of force multiplication results from the angled clutching surfaces 37, such force multiplication factor depending on the angle. In FIG. 4, all of the points on the plunger 48, the rollers 42 and 47, the lever 15, and the clutching surfaces 37 involved in the force multiplication results are indicated by directional arrows. Extremely secure clutching retention is maintained by the mechanism 10.

It will be understood that variations and modifications may be effected without departing from the spirit and scope of the novel concepts of this invention.

I claim as my invention:

1. A mechanism for releasably locking or braking an elongate element and associated structure against a relative movement, including a member adapted to be mounted on said associated structure and having clutching surface means for releasable clutching engagement with one side of said elongate element, a locking lever having one end pivotally mounted on said member, said locking lever having intermediate its ends a gripping clamping clutch area engageable with said element generally opposite to said clutching surface means, and means for rocking said lever toward said element and said clutching surface means for effecting locking gripping clamping thrust of said clutch area against said element and toward said clutching surface means for thereby releasably locking or bracking said element and said associated structure against said relative movement, and comprising:

said member having a body carrying a force applying actuator and a flat sided extension adapted to project past said elongate element;
said extension having a recess accomodating said elongate element therethrough;
said recess being defined by surfaces providing said clutching surface means;
said lever having spaced coextensive portions straddling said extension and extending past said recess;
means pivotally connecting said lever portions to said extension spaced from said recess in direction away from said body;
a roller connected on an axle between free head parts of said lever portions adjacent to said body;
a transmission roller riding on and between said lever mounted roller and a thrust shoulder on said extension;
and means operated by said actuator for driving said transmission roller into force transmitting relation to said lever mounted roller whereby to effect said rocking of said lever toward said element and said clutching surface means.

2. In an assembly comprising an elongate element and associated structure and mechanism for releasably locking or braking said element and structure against a relative movement, said mechanism comprising a member having means mounting it on said associated structure and having clutching surface means for releasable clutching engagement with one side of said elongate element, a locking lever and means pivotally mounting one end portion of said lever on said member, said locking lever having a gripping clamping clutch area engageable with said element generally opposite to said clutching surface means, and means carried by said member for rocking said lever toward said element and said clutching surface means for effecting locking gripping clamping thrust of said clutch area against said element and toward said clutching surface means for thereby releasably locking or braking said element and said associated structure against said relative movement:

said means mounting said member comprising a body carrying a force applying actuator;
said body having a flat-sided extension adapted to project past said elongate element;
said extension having a recess accommodating said elongate element therethrough;
said recess defined by surfaces providing said clutching surface means;
said lever having spaced coextensive portions straddling said extension and extending past said recess;
means pivotally connecting said lever portions to said extension spaced from said recess in direction away from said body;
a roller connected on an axle between free head parts of said lever portions adjacent to said body;
a transmission roller riding on and between said lever mounted roller and a thrust shoulder on said extension;
and means operated by said actuator for driving said transmission roller into force transmitting relation to said lever mounted roller whereby to effect said rocking of said lever toward said element and said clutching surface means.

3. A mechanism for releasably locking or braking an elongate round way element and associated structure supported on said element selectively against a relative movement, comprising:

a member adapted to be mounted on said associated structure and having a recess through which said round way element is adapted to extend;
one side of said recess having a slot for clearing supporting bracket means of said element;
clutching surfaces within said recess converging toward said slot and adapted for releasably clutching engagement with one side of the elongate round way element;
an elongate locking lever extending across the opposite side of said recess;
means pivotally mounting one end portion of said lever on said member;
said locking lever having an intermediate gripping clamp clutch area engageable with said round way element generally opposite to said clutching surfaces;
and means carried by said member adapted to act on the opposite end portion of said lever for rocking said lever toward said round way element and said clutching surfaces for effecting locking gripping clamping thrust of said clutch area against said round way element and thrusting said element toward said clutching surfaces for thereby releasably locking or braking said element and said associated structure against said relative movement;
said means for rocking said lever comprising a roller mounted on said opposite end portion of said lever, transmission roller means having a perimeter engaging against and between said roller and a shoulder on said member, and power means adapted to drive against said transmission roller means perimeter for rocking said lever toward said round way element.

4. An assembly according to claim 2, wherein said body is supported in a substantially floating condition by said structure, and said body and said structure having means retaining said body and said structure against relative movement in the direction of the axis of said elongate element.

5. A mechanism according to claim 3, wherein said power means comprises an actuator carried by said member and having a plunger thrusting toward said transmission roller means perimeter.

6. In an assembly comprising an elongate round way element having bracket means for supporting it on frame means, associated structure supported by antifriction means in stable relation on said round way element for adjustment therealong, and said anti-friction means flanking mechanism for releasably locking or braking said element and structure against a relative movement:

said mechanism comprising a member extending between said anti-friction means and having means mounting said member on said associated structure, and said member having a recess through which said round way element extends;
one side of said recess having a slot for clearing said bracket means;

clutching surfaces within said recess converging toward said slot and adapted for releasably clutching engagement with one side of said elongate round way element;

an elongate locking lever extending across the opposite side of said recess;

means pivotally mounting one end portion of said lever on said member;

said locking lever having an intermediate gripping clamping clutch area engageable with said round way element generally opposite to said clutching surfaces;

and means carried by said member adapted to act on the opposite end portion of said lever for rocking said lever toward said round way element and said clutching surfaces for effecting locking gripping clamping thrust of said clutch area against said round way element and thrusting said round way element toward said clutching surfaces for thereby releasably locking or braking said associated structure against said relative movement;

said means for rocking said lever comprising a force multiplying transmission device including a roller mounted on said opposite end portion of said lever, a force transmission roller acting on said lever mounted roller and on a shoulder on said member, and power means driving against said transmission roller.

7. An assembly according to claim 6, wherein said means mounting said member comprises a body, and said body and said structure having means restraining relative movement of the body and structure in the direction of the axis of said elongate element, but permitting relative movement of said body and said structure in other directions.

8. An assembly according to claim 6, wherein said power means comprises an actuator carried by said member and having a plunger thrusting toward said transmission device roller.

9. An assembly according to claim 6, wherein said elongate round way element is located in spaced relation above a second elongate round way element supported by said frame means, said associated structure comprising a rotary disk slitter blade carrier and having means supporting it on said round way elements for adjustment along said elements, said carrier having means located above the upper of said round way elements cooperating in mounting relation with the mounting means of said member and permitting limited substantially free-floating movement of said member relative to said carrier except in the direction of the axes of said elements, said member having a downward extension which has said recess, and said power means comprising a selectively operable actuator.

* * * * *